United States Patent [19]

Guyoncourt

[11] Patent Number: 4,907,894
[45] Date of Patent: Mar. 13, 1990

[54] SURFACE-TEMPERATURE SENSING METHOD AND APPARATUS

[75] Inventor: David M. Guyoncourt, Oxfordshire, England

[73] Assignee: BNF Metals Technology Centre, Oxfordshire, England

[21] Appl. No.: 286,793

[22] Filed: Dec. 20, 1988

[51] Int. Cl.⁴ .......................... G01K 3/02; G01K 13/04
[52] U.S. Cl. ...................................... 374/120; 374/45; 374/153
[58] Field of Search ...................... 374/7, 5, 6; 73/37.5

[56] References Cited

U.S. PATENT DOCUMENTS

| | | | |
|---|---|---|---|
| 4,430,010 | 2/1984 | Zrenner et al. | 374/5 X |
| 4,433,571 | 2/1984 | Snow, Jr. | 73/37.5 |
| 4,501,504 | 2/1985 | Urmenyi et al. | 374/120 X |
| 4,558,959 | 12/1985 | Thomas et al. | 374/165 X |
| 4,607,960 | 8/1986 | Wulff | 73/37.5 X |
| 4,611,403 | 9/1986 | Morita et al. | 33/561 X |

Primary Examiner—Daniel M. Yasich
Attorney, Agent, or Firm—Wenderoth, Lind & Ponack

[57] ABSTRACT

An apparatus suitable for measuring the surface temperature of a moving strip at an elevated temperature comprises a sensing head connected to a pneumatic actuator through a ball joint. Air under pressure is supplied to a chamber in the head and flows through a ring of passages to form an air cushion between the sensing head and the surface S whose temperature is to be measured. Part of the air flows inward across the surface S to a central aperture in the bottom plate of the head and its temperature is measured by a thermocouple in the aperture. The aperture leads to a cavity above plate and the cavity is vented by passages. The temperature recorded by the thermocouple is a measure of the temperature of surface S.

16 Claims, 1 Drawing Sheet

U.S. Patent    Mar. 13, 1990    4,907,894
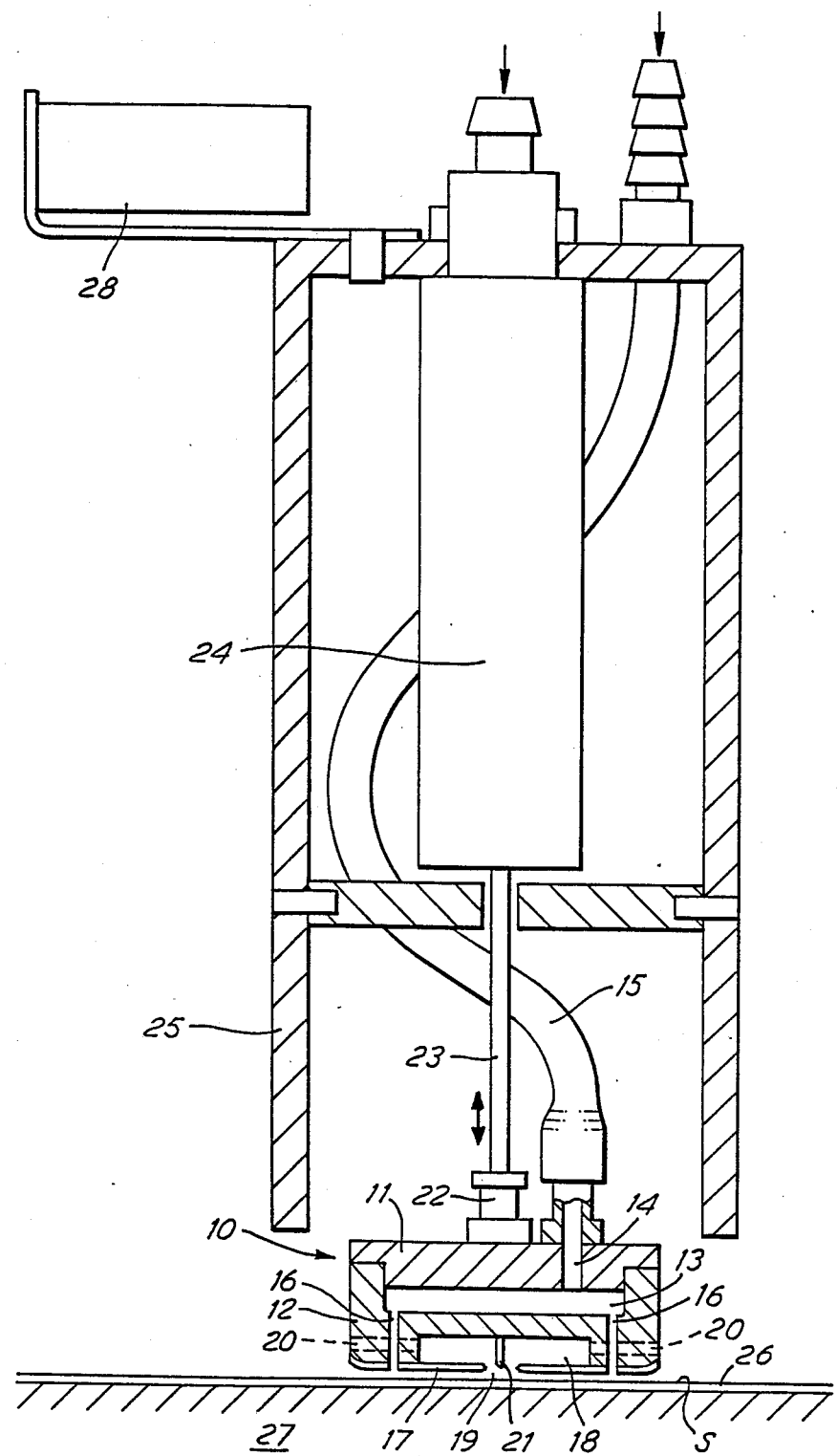

SURFACE-TEMPERATURE SENSING METHOD AND APPARATUS

FIELD OF THE INVENTION

This invention relates to a surface-temperature sensing method and apparatus and is more particularly concerned with apparatus for providing a measure of the surface temperature of a workpiece at an elevated temperature by the use of forced convection.

SUMMARY OF THE INVENTION

According to the invention there is provided surface-temperature sensing apparatus comprising a sensing head having a surface to face the surface whose temperature is to be measured, means for supporting the sensing head to maintain the surface thereof a uniform distance away from the surface whose temperature is to be sensed, the sensing head having a port opening to the face thereof, a flow passage or series of flow passages opening to the face and encircling the port, means for producing a pressure difference between the passage or passages and the port, and means for measuring the temperature of air flowing through the port in consequence of the pressure difference.

The means for supporting the sensing head may be a servo device or a magnetic levitation device, but in preferred arrangements is an air cushion. In one such air cushion arrangement, air under a predetermined pressure is fed to the passage or passages encircling the port, this flow of air serving both to form the air cushion and to produce the inward flow of air across the surface to the port.

Preferably the port opens to a vented cavity formed in the sensing head behind a partition, one face of which bounds the cavity and the other face of which constitutes the face of the sensing head.

The invention also provides a method of sensing the surface temperature of a workpiece at an elevated temperature comprising supporting at a substantially constant distance above the surface a sensing head having a face which is maintained at a substantially constant distance from but closely adjacent the surface, and causing air to flow from a passage or series of passages centered on a post in the face to the port, and sensing the temperature of the air by means of a sensing device disposed in the air flow through said port.

The method and apparatus have a particularly useful application in process controls in the metals industry for the measurement of rolling mill roll temperatures and moving metal strip temperatures and in the plastics, rubber, paper and other industries where roll or product temperatures are required to be controlled.

BRIEF DESCRIPTION OF THE DRAWINGS

The invention is described herein below in more detail with reference by way of example to the accompanying diagrammatic drawing showing a side view of a surface-temperature sensing apparatus according to the present invention.

DESCRIPTION OF THE PREFERRED EMBODIMENT

Referring to the drawing, a sensing head 10 is supported above a surface S, whose temperature is to be measured. The sensing head comprises a body portion formed in two parts 11, 12 which are bonded or otherwise secured together and form between them a chamber 13 connected through a passage 14 and a flexible pipe 15 to receive air at a predetermined pressure. From chamber 13 the air flows through a ring of restricted air passages 16 opening to the bottom surface of the sensing head.

The bottom surface of the sensing head is provided by an annular plate or partition 17 which is bonded or otherwise secured to the bottom face of the body part 12. The central part of the plate extends across a cavity 18 formed in the underside of the body part 12, and provides a central port 19. The cavity 18 is vented to atmosphere by way of radial passages 20 extending through the body part 12. A thermocouple 21 is disposed in the cavity 18 directly above the port 19 and senses the temperature of the air flowing from the passages 16, radially inward between the surface S and the plate 17 and through the port into the cavity, to provide a measure of the temperature of surface S.

The sensing head 10 is suspended by a ball joint 22 from the lower end of the piston rod 23 of a double-acting piston and cylinder type of pneumatic actuator 24. The actuator piston is of very light weight and may be made of graphite, for example. Air pressure is employed above the piston to press the sensing head lightly towards the surface S. Air pressure may be applied to the underside of the piston to raise the sensing head into a position in which it is protected by a housing 25 in which the actuator 24 is mounted.

The plate 17 is preferably made from a machinable ceramic material which may be sintered if desired. The plate and at least the surfaces of the cavity and venting passages 20 are coated with a high temperature-resistant lacquer or other sealing substance to render the surfaces non-porous so as to prevent any oil or other liquid on the surface of the workpiece from entering the pores of th ceramic material and adversely affecting the response value and/or the response time of the sensing head.

In one application of the apparatus, the surface S is the surface of a metal strip 26 which is moving at a steady speed acorss a support 27. The emergent air forms an air cushion on which the sensing head floats above the surfaces. The air cushion supports the sensing head at a constant and precise height, say 0.5mm, above the surface S. The constant but yielding downward pressure of the actuator and the ball joint 22 enable the sensing head to tilt and rise, if necessary, to ride over ripples or other distortions in the strip. The supply of air to the underside of the actuator can be actuated to draw the sensing head into the housing 24 quickly to avoid damage to the sensing head in an emergency.

Only a minor proportion of the air flows inward to the central port 19, its temperature being measured by thermocouple 21 which is connected to an appropriate meter via a thermocouple connenctor 28, the major proportion flowing outward. The surface temperature can be determined by prior calibration of the device or can be estimated from $$\frac{T_l - T_o}{T_s - T_o} = l - e^{-k}$$

where $K = 0.6 \frac{HA}{\rho c V}$ and A = area in mm² over which heat transfer occurs
V = volume of air flow in liter/min H heat transfer coefficient in cal/cm$^2$/s/K
$\rho$ average density of the air in g/liter
c average specific heat of air in cal/g
$T_o$ air temperature in degrees Centigrade before contacting the surface
$T_f$ final air temperature in degrees Centigrade
$T_s$ surface temperature being measured, in degrees Centigrade However, over a substantial range of ambient atmospheric temperatures, the value of $T_o$ has little or no effect on the measured temperatures $T_1$.

In an alternative mode of operating the apparatus, a null heat transfer mode, the temperature of the air supplied to passages 16 is variable, controlled and measured. This temperature $T_o$ is increased until there is a zero temperature difference between $T_o$ the temperature of the air entering and $T_1$ the temperature of the air measured by thermocouple 21. The air temperature is then equal to the temperature of the surface S. The air can conveniently be heated by incorporating a heating element in the chamber 13.

The apparatus can be employed to measure the surface temperature of a moving strip of aluminum, plastics or other material. By appropriately shaping the under surface of the sensing head the apparatus can also be used to measure the temperature of rotating rolls where the roll temperature is required to be controlled.

The apparatus shown in the drawing is advantageous in that there is no contact between the apparatus and the surface where temperature is to be measured and the floating sensing head is positionally self-adjusting in relation to the surface. The apparatus is inexpensive in relation to radiation pyrometers and is not subject to emissivity errors. The cooling effect of the airflow on the surface is very slight and in the second of the two modes of operation described above, there is no cooling effect and no error will arise by reason of differences in surface heat transfer coefficient. The air temperature measured in the duct approaches that of the surface and it has been found that there is a linear relationship between the surface temperature and the measured rise in temperature of the air.

I claim:

1. A surface temperature sensing apparatus, comprising:
   a sensing head, said sensing head having a first chamber therein;
   a partition on said sensing head having opposite major surfaces, one said major surface defining a wall of said first chamber, and said partition having a central port;
   a temperature sensing device disposed in said first chamber and located adjacent said central port;
   a second chamber in said sensing head, said second chamber having a connection for receiving gas;
   port means disposed about said first chamber, encircling said central port and connected to said second chamber for having gas supplied therefrom;
   means for floatingly supporting said sensing head for maintaining said partition facing and uniformly spaced from a surface whose temperature is to be measured;
   outlet port means for exhausting from said first chamber gas entering said first chamber from said central port and for producing a pressure difference between said port means and said first chamber to cause gas to flow radially inwardly from said port means, across the other of said opposite major surfaces, and through said central port into said first chamber.

2. The apparatus as set forth in claim 1, wherein said means for floatingly supporting said sensing head comprises a supply of air at a predetermined pressure fed to said second chamber and flowing out through said port means encircling said central port, thereby producing an air cushion between said sensing head and the surface whose temperature is to be measured.

3. The apparatus as set forth in claim 1, wherein said partition is made of a machinable ceramic material having a coating thereon rendering said ceramic material non-porous.

4. The apparatus as set forth in claim 3, wherein said sensing head comprises a body portion made of a ceramic material, said body portion having surfaces thereof defining said first cavity and having a coating thereon rendering said surfaces non-porous.

5. The apparatus as set forth in claim 1, and further comprising a support for said sensing head and a universal pivot mounting said sensing head to said support.

6. The apparatus as set forth in claim 5, wherein said universal pivot comprises a ball joint.

7. The apparatus as set forth in claim 6, wherein said support comprises a means for yieldably biasing said sensing head towards the surface whose temperature is to be measured.

8. The apparatus as set forth in claim 7, wherein said means for yieldably biasing comprises a piston and cylinder connected to said sensing head and means for supplying air at a predetermined pressure to said cylinder to bias said sensing head towards the surface to be measured.

9. The apparatus as set forth in claim 8, wherein said means for yieldably biasing is also for retracting said sensing head away from the surface to be measured.

10. The apparatus as set forth in claim 9, wherein said support further comprises a protective housing for said sensing head when said sensing head is retracted by said means for yieldably biasing and retracting.

11. The apparatus as set forth in claim 5, wherein said support comprises a means for yieldably biasing said sensing head towards the surface whose temperature is to be measured.

12. The apparatus as set forth in claim 11, wherein said means for yieldably biasing comprises a piston and cylinder connected to said sensing head and means for supplying air at a predetermined pressure to said cylinder to bias said sensing head towards the surface to be measured.

13. The apparatus as set forth in claim 12, wherein said means for yieldably biasing is also for retracting said sensing head away from the surface to be measured.

14. The apparatus as set forth in claim 13, wherein said support further comprises a protective housing for said sensing head when said sensing head is retracted by said means for yieldably biasing and retracting.

15. A surface temperature sensing apparatus for measuring the temperature of a surface, comprising:
   a thin partition plate having opposite major faces, one of said faces for disposition in facing relationship with a surface to be measured;
   a central port in said thin partition plate;
   a temperature sensing device disposed on the side of said thin partition plate adapted to face away from the surface to be measured adjacent said central port;

port means encircling said central port and opening onto said one face of said thin partition plate for facing toward the surface to be measured;

means for floatingly maintaining said thin partition plate facing and uniformly spaced from the surface to be measured; and means for producing a pressure difference between said port means and said central port for inducing a flow of gas from said port means radially inwardly between said thin partition plate and the surface to be measured, through said central port and past said temperature sensing device.

16. A surface temperature sensing apparatus for measuring the temperature of a surface, comprising:
a sensing head;
means for supporting said sensing head;
mean for supplying a gas to said sensing head;
a cavity in said sensing head;
a partition plate on said sensing head and bounding one side of said cavity, said partition plate having a central port therein;
a temperature sensing device adjacent said central port of said partition plate;
a plurality of ports in said partition plate about said central port;
means in said sensing head for receiving said gas and conducting said gas to said plurality of ports; and
means in said sensing head for producing a pressure difference between said cavity and said plurality of ports.

* * * * *